Feb. 28, 1956 W. B. DEGENFELDER 2,736,518
AIRCRAFT TRIM AND ARTIFICIAL FEEL SYSTEM
Filed July 29, 1952 2 Sheets-Sheet 1

INVENTOR:
WALTER B. DEGENFELDER

BY Hubert E. Metcalf
HIS PATENT ATTORNEY

Feb. 28, 1956 W. B. DEGENFELDER 2,736,518
AIRCRAFT TRIM AND ARTIFICIAL FEEL SYSTEM
Filed July 29, 1952 2 Sheets-Sheet 2
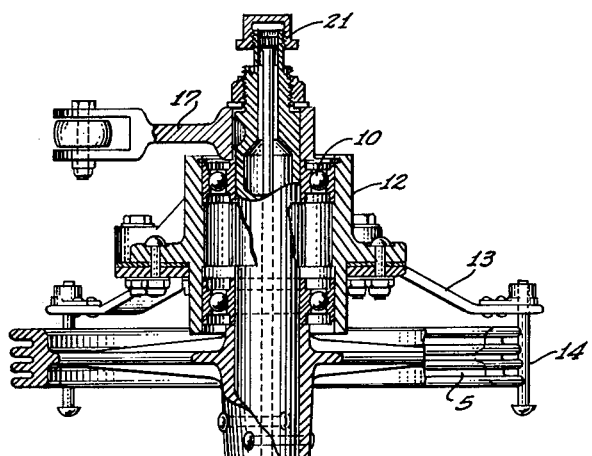
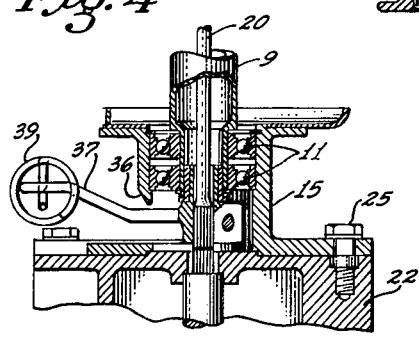
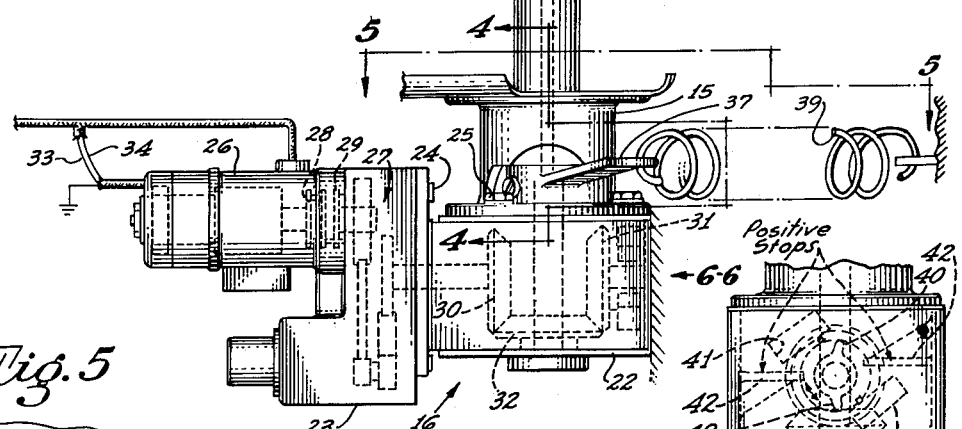
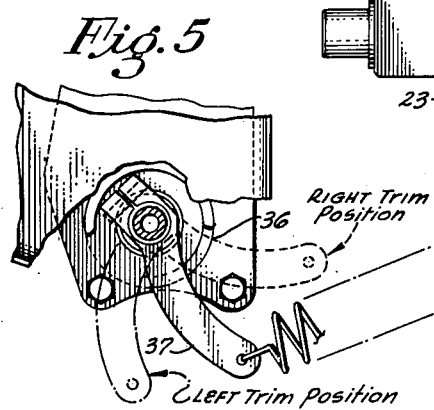
INVENTOR:
WALTER B. DEGENFELDER
HIS PATENT ATTORNEY

United States Patent Office 2,736,518
Patented Feb. 28, 1956

2,736,518

AIRCRAFT TRIM AND ARTIFICIAL FEEL SYSTEM

Walter B. Degenfelder, Inglewood, Calif., assignor to Northrop Aircraft, Inc., Hawthorne, Calif., a corporation of California Application July 29, 1952, Serial No. 301,531

3 Claims. (Cl. 244—83)

The present invention relates to trim controls for an airplane utilizing full powered control surfaces and, more particularly, to a trim control device for reducing the stick forces to zero after an airplane has been manually trimmed.

Due to the ever increasing use of instruments, such an engine condition indicators, radar, etc., present in high speed airplanes, particularly multimotored pursuit or combat types, the trimming of an airplane quickly and efficiently becomes a major task for the pilot. The conventional sequence of pilot response to an out-of-trim condition is, first, the use of the normal controls by manual application of control column or pilot's stick forces, and then the operation of various trim tabs until trim is restored, thus releasing the pilot from maintaining the control forces.

This conventional trimming procedure, as described above, entails sequential operation of one or more of the trim control elements, which distracts the pilot's attention from other and what may be more important operations. It is, therefore, an object of the present invention to provide a quick and efficient centralizing and trim system that will normally centralize the controls, and also remove control element trim forces with only momentary attention by the pilot. Another object of the invention is to provide a trim system which may, if desired, be completely power operated.

In an airplane employing power operated control surfaces, for example, by a hydraulic servomotor, the pilot cannot feel any of the aerodynamic forces acting on the control surfaces. It is customary, therefore, when control surfaces are full power operated to utilize a control force producer to provide a synthetic "feel" to simulate conventional piloting procedures, this synthetic "feel" is of course, fed back to the pilot's controls. It is, therefore, another object of the present invention to provide a means of shifting the control neutral away from the normal operating neutral, of one or more control elements, to compensate for out-of-trim moments.

A control force producer, to provide synthetic "feel," as described above, may take various forms and in the present invention is disclosed as a simple centering spring.

Other advantages and objects of the invention will be apparent from the following description and appended drawings in which:

Figure 3 is a side elevational view, partly in section, of the trim control device viewed from the plane 3—3 of Figure 2.

Figure 4 is a fragmentary sectional view of the trim control device taken on the line 4—4 of Figure 3.

Figure 5 is a sectional view of the trim control device taken on the line 5—5 of Figure 3.

Figure 6 is a side view of the trim control device showing the relationship of positive stops and limit switches viewed from the plane 6—6 of Figure 3.

The trim control device, of the present invention, is disclosed as off-setting the forces exerted by the control force producer in connection with the ailerons of an airplane, however, it may be used in connection with other control surfaces of an airplane.

Figure 1:
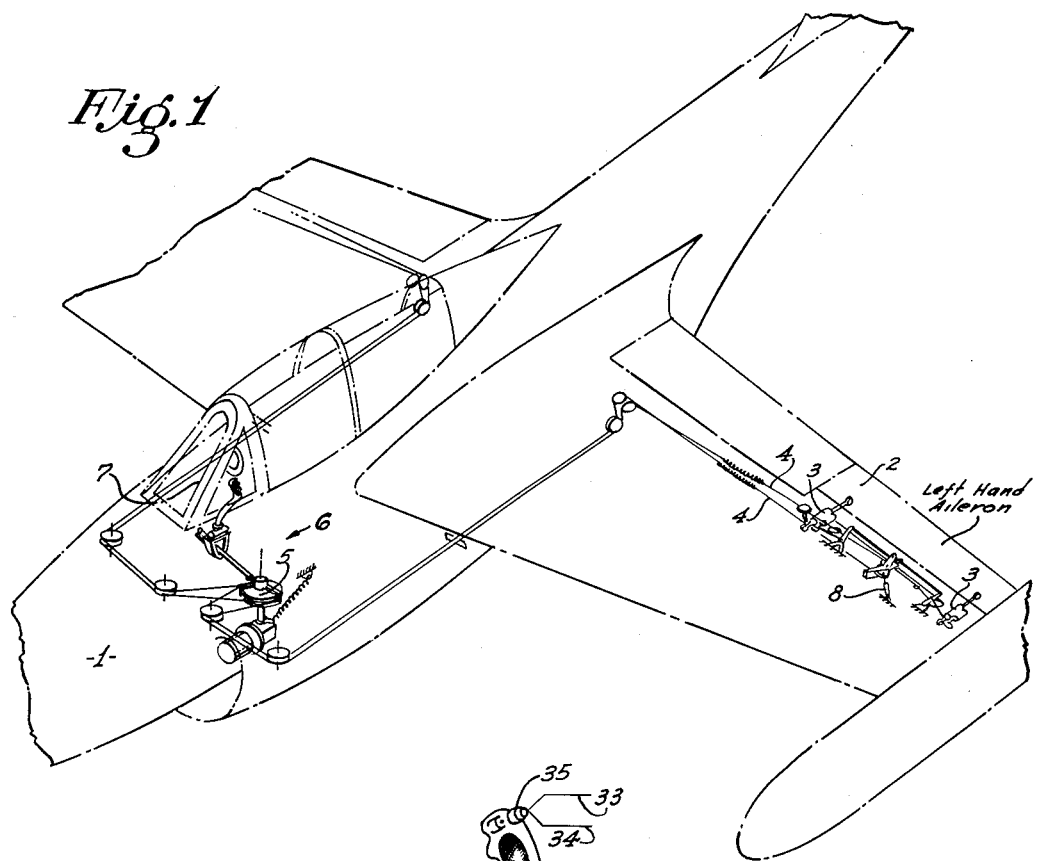
Figure 1 is a diagrammatic perspective view of an airplane showing an aileron cable control system embodying the present invention.

Referring first to Figure 1 for a detailed description of this invention, an airplane 1 has two ailerons 2 (only one being shown). The aileron 2 is rotated about its hinge line by two cable-controlled hydraulic actuators 3, 3 located at each end portion thereof. Each actuator is controlled by two control cables 4, 4 which are connected to an aileron control quadrant 5, located beneath the floor 6 of the cockpit 7.

Located in the trailing edge of each wing, midway between the aileron actuators 3, 3 is a centering spring 8, which in the present disclosure constitutes the control force producer. The spring, as is well known in the art, has a dual function of providing stick "feel," in conjunction with a trim torsion bar, to be described later, and holding one or both ailerons in neutral in the event of cable failure.

Figure 2:
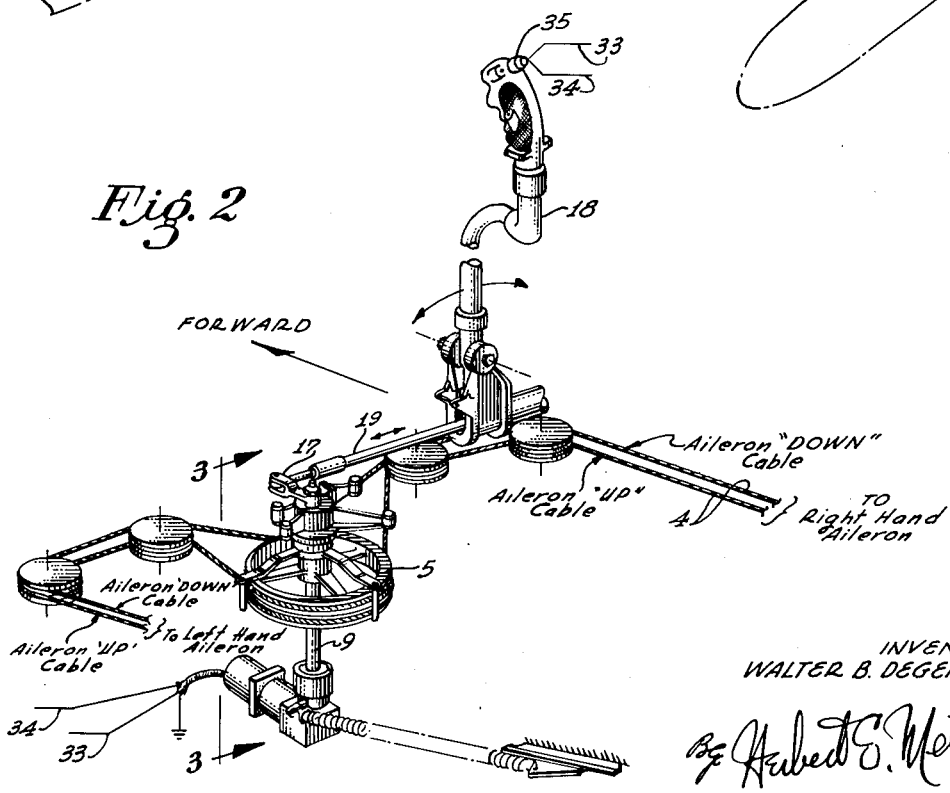
Figure 2 is a perspective view, on a larger scale, showing the present invention as applied to aileron control.

As best seen in Figures 2 and 3, the aileron control cables 4, 4 are secured to the aileron quadrant 5 and rotates therewith. The aileron quadrant 5 is fixedly mounted to a vertical shaft 9 mounted for rotation in bearings 10 and 11 located near its upper and lower ends respectively. The top bearing 10 is mounted in a housing 12 which supports a plurality of radial arms 13. Each radial arm 13 has a vertical pin like member 14 depending from its outer end in close relationship with the periphery of the aileron quadrant 5 for maintaining cables 4, 4 in their proper position on said quadrant. The lower bearing 11 is mounted in a housing 15 secured to a structural element of the airplane. Also secured to the bearing housing 15 is a trim actuator unit 16.

Also mounted on the upper end of shaft 9 is an arm 17 which is keyed to said shaft. Connecting the bifurcated end of arm 17 and the pilot's control stick 18 is an adjustable connecting member 19 through which movement of the stick is transmitted to the aileron quadrant 5.

The vertical shaft 9 is hollow throughout its length and passing coaxially therethrough is a torsion bar 20 mounted for limited rotation. The torsion bar 20 is secured to the uppermost end of shaft 9 by means of serrations 21, its lower end terminates below shaft 9 and is mounted in the base portion of the trim actuator 16 for limited rotation, as presently described.

The trim actuator, located at the lower portion of shaft 9, comprises a pair of housings 22 and 23 secured together by cap screws 24. The housing 22 is attached to bearing housing 15 by cap screws 25. A reversible motor 26 is attached to housing 23 and is drivingly connected to a reduction gear 27 in said housing through a magnetic clutch 28. Also positioned between the motor 26 and the input shaft of reduction gear is a magnetic brake 29. The output shaft of reduction gear 27 drives a bevel gear 30 mounted for rotation in a wall portion of housing 22 about a horizontal axis. Facing the gear 30 and mounted on a coaxial axis in the opposite wall of housing 22 is another bevel gear 31. Fixedly secured to the lower end of torsion bar 20 is a third bevel gear 32 which is driven by gear 30 and drives the gear 31.

Electrical conductors 33 and 34 connect the switch 35 on the pilot's stick with the respective circuits of the reversible electric motor 26 as shown in Figure 2.

As best seen in Figures 4 and 5 the wall portion of bearing housing 15 is apertured at 36. Fixedly secured to torsion bar 20 and extending through the aperture 36 is an arm 37. Attached between the end portion of said arm and a structural element 38, of the airplane, is a helical spring 39, said spring being under tension at all times exerts a pull on arm 37 and torsion shaft 20, thus preventing backlash in the gear system described above.

As best seen in Figure 6, the hub portion of bevel gear 31 has two diametrically positioned lugs 40, 40 which contact limit switches 41, 41 upon rotation. The limit switches are connected in series with the respective circuits of the reversible motor 26 and limits the rotational travel of the motor and consequently the torsion bar 20. Non-adjustable mechanical stops 42, 42 are incorporated in the side wall of housing 22 (Figure 6). The mechanical stops provide a positive limit of rotation of the torsion bar 20 in the event of failure or maladjustment of limit switches 41, 41.

Operation

At such times as the control surfaces of an airplane are being manually controlled, it becomes necessary for the pilot to trim his airplane as the center of gravity shifts. A shifting of the center of gravity will occur as the engine fuel is consumed, rockets or ammunition is discharged, etc.

In the present embodiment of the invention the pilot will impart desired movement to the aileron control surfaces by movement of the stick 18. This movement is transmitted from the stick through the connecting member 19, arm 17, shaft 9, aileron control quadrant 5, cable system 4, 4 and actuators 3, 3 to the aileron 2.

During the above operation a torsional stress is induced in the torsion bar 20, as its upper end is fixedly secured and rotates the same amount as quadrant 5 and shaft 9, while its lower end is held in a predetermined rotational position by brake 29 acting through the gearing system 27.

Under the above conditions a force is exerted on the pilot's stick equal to the combined force of the centering spring 8 and the torsional stress induced in the torsion bar 20. To relieve the force on the pilot's stick the torsion bar 20 is rotated, by means of electric motor 26 and gear system 27, until the stress is removed from bar 20 and an opposite stress is induced therein of sufficient magnitude to offset the force exerted by the centering spring 8. Thus the forces acting on the pilot's stick are reduced to zero at the new position and no effort is required to maintain the stick in its new position.

The electric motor 26 is reversed by means of the switch 35 located on the pilot's stick, through electrical conductors 33 and 34. Movements of the switch 35 to the right energizes the electric motor's circuit for clockwise rotation while movement of the switch to the left produce a counterclockwise rotation of said motor.

From the above description it will be apparent that there is thus provided a trim control device of the character described which will effectively reduce the stick forces to zero after an airplane has been manually trimmed. Obviously, the trim control device of the present invention is susceptible of modifications in its form, proportions, detail construction and arrangement of parts as will be apparent to anyone skilled in the art.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. In a power controlled system including a pilot's control element and cable and linkage means for operating an altitude control surface of an aircraft, an artificial feel and trim device comprising: a hollow shaft mounted on fixed structure of said aircraft for angular movement about the axis of said shaft; a solid rod coaxially arranged within said hollow shaft and having a first end fixedly secured to said shaft and the other end thereof extending beyond an end of said shaft; driving means mounted on fixed structure of said aircraft and having a rotatable portion thereof in contact with the extending end of said rod whereby the latter may be maintained in a first position corresponding to the normal neutral position of said pilot's control element and in which said rod is free of torsional stress and movable to a plurality of operational positions located angularly in each direction from said first position; lever means attached to said shaft whereby movements of said control element may be transmitted to said shaft; and a cable quadrant fixedly secured to said shaft in coaxial relationship and being adapted to receive a pair of cables whereby angular movement of said shaft may be transmitted to said control surface.

2. Apparatus as set forth in claim 1 including a pair of bearings mounted on said shaft, one of said bearings being located adjacent each end of said shaft.

3. Apparatus as set forth in claim 2 further characterized by said driving means comprising a bidirectional rotary electric motor and associated gear means; the electric motor being connected for operation by the pilot of said aircraft.

References Cited in the file of this patent

UNITED STATES PATENTS

| 1,976,479 | Butler | Oct. 9, 1934 |
| 2,227,375 | Carlson | Dec. 31, 1940 |
| 2,508,883 | Knowler et al. | May 23, 1950 |
| 2,583,828 | Gerstenberger | Jan. 29, 1952 |
| 2,604,613 | Klass | July 22, 1952 |
| 2,623,717 | Price | Dec. 30, 1952 |

FOREIGN PATENTS

| 614,102 | Great Britain | Dec. 9, 1948 |
| 663,269 | Great Britain | Dec. 19, 1951 |

OTHER REFERENCES

Naca Technical Note 2496, pages 21 and 22, October 1951.